Sept. 20, 1971  LEE B. HOLMAN  3,605,996
MATERIAL HANDLING APPARATUS AND MEANS TO IMPART
VIBRATORY FORCES THERETO
Filed June 25, 1969  3 Sheets-Sheet 1
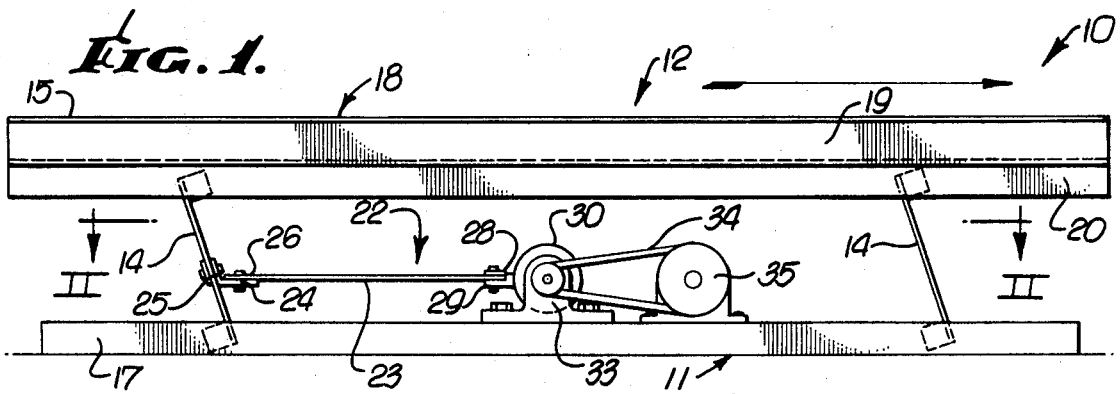
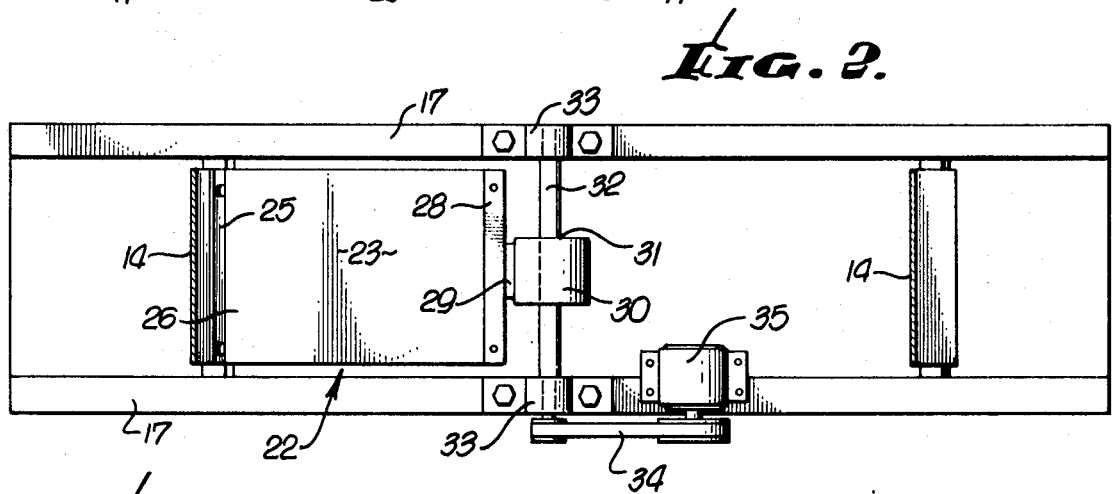
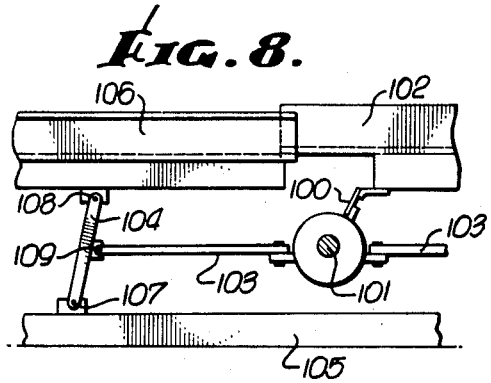
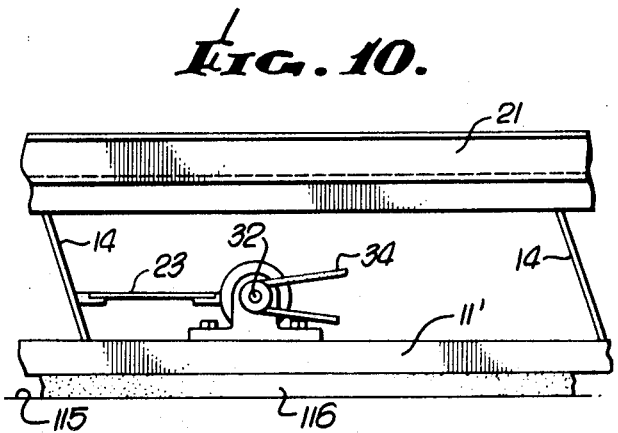
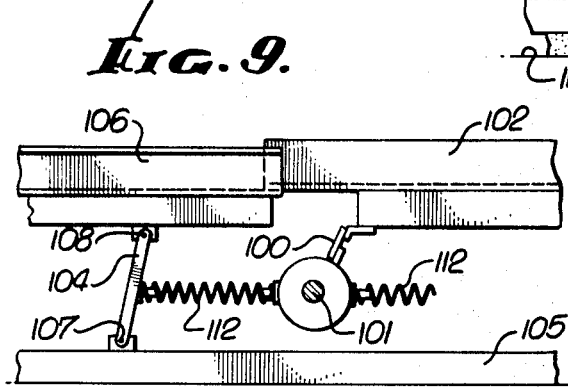
INVENTOR.
LEE B. HOLMAN
By
Miketta, Glenny, Poms & Smith
ATTORNEYS.

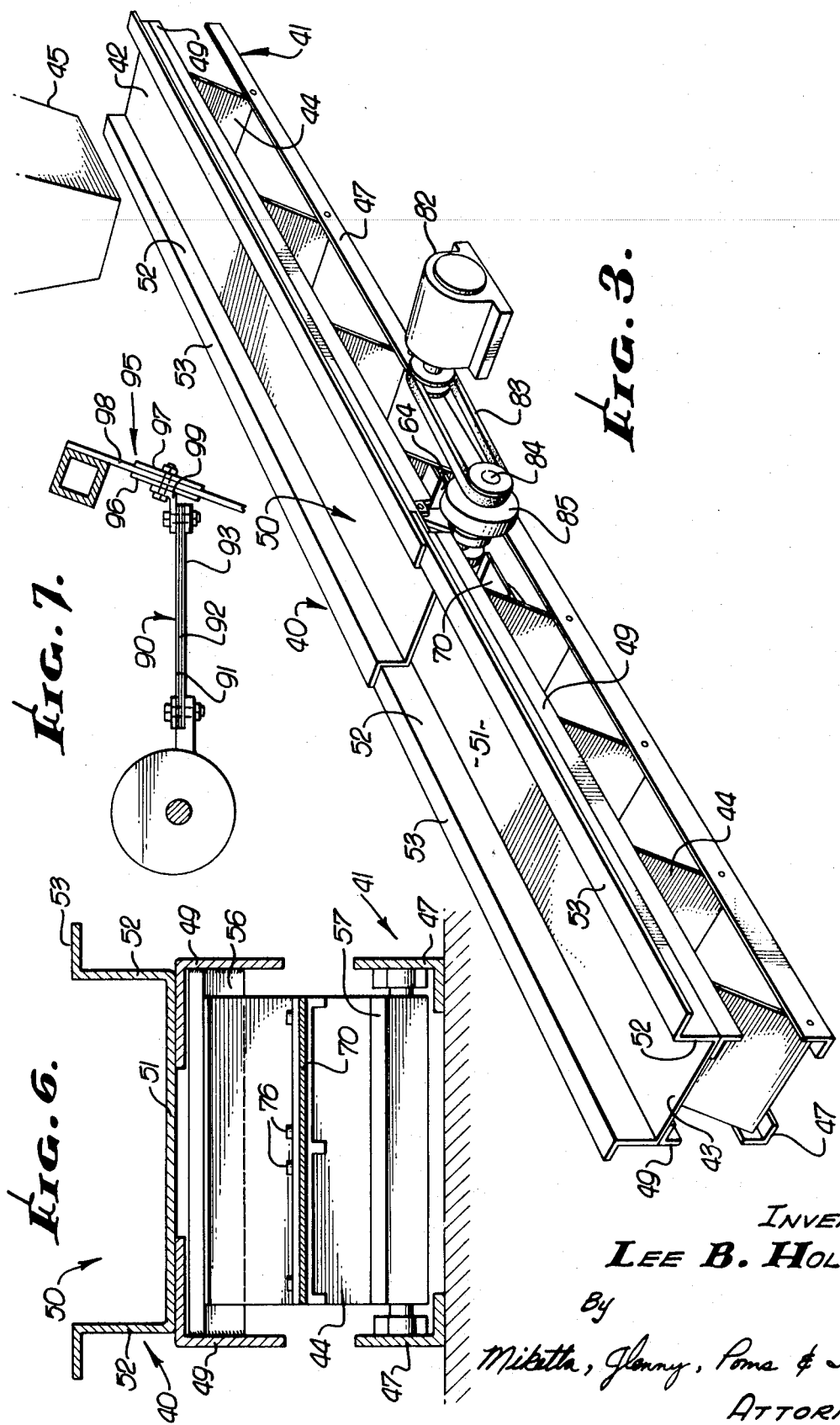

INVENTOR.
LEE B. HOLMAN
By
Miketta, Glenny, Poms & Smith
ATTORNEYS.

United States Patent Office 3,605,996
Patented Sept. 20, 1971

3,605,996
MATERIAL HANDLING APPARATUS AND MEANS
TO IMPART VIBRATORY FORCES THERETO
Lee B. Holman, Whittier, Calif., assignor to State Steel
Products, Inc., City of Industry, Calif.
Filed June 25, 1969, Ser. No. 836,527
Int. Cl. B65g 27/00
U.S. Cl. 198—220CB                           6 Claims

ABSTRACT OF THE DISCLOSURE

A material handling apparatus for conveying material along a longitudinal path including conveyor means supported by a plurality of spaced inclined members and means to actuate or impart vertical and longitudinal force components to material being conveyed along said path. Actuating means includes a resilient member, such as a flexible driven leaf having an eccentric connection to a driven rotatable shaft and having a transverse connection to the adjacent inclined support member. The driven rotatable shaft may be mounted on a base frame means or may be floatably mounted from the conveyor means, the apparatus including a stabilizing means carried by the conveyor means for the floatably mounted rotatable shaft.

BACKGROUND OF THE INVENTION

Prior proposed material handling apparatus have included conveyor means for movement of material along a longitudinal path, the conveyor means being supported from a base frame by a plurality of longitudinally spaced resilient inclined leaves or members. Various types of actuating means have been employed to impart vibration to the conveyor means. Usually such prior actuating means have included eccentric connections between the conveyor means and a drive means. In some instances, vibration forces were imparted to the supporting floor of building structure and such forces were minimized by various types of cushioning means. In other instances, the vibratory forces acting upon the floor supporting structures were neutralized or canceled. In all such prior proposed actuating means known to me, the driving forces or impulses were transmitted from the eccentric connection to a driven rotatable shaft through an intermediate link and pivotal connection directly to the conveyor means. Depending upon the loads for which the material handling apparatus was designed such prior proposed actuating means were constructed and arranged with relatively heavy force transmitting members, relatively heavy bearing loads and the amount of throw was dependent upon the design and adjustment of the eccentric connection at the driven rotatable shaft.

The present invention contemplates a novel material handling vibratory apparatus and actuating means therefor adapted for use on a drive shaft mounted on a base frame means or on a drive shaft floatingly mounted with respect to the base frame and supported from the vibratory conveyor means. The invention contemplates a novel actuating means for such a conveyor means wherein drive forces are transmitted from the eccentric connection at the rotatable drive shaft through a flexible leaf member to a resilient inclined support member and thence to the conveyor means. The flexibility of the flexible drive leaf and also the inclined support member provides amplification of the driving forces imparted to the conveyor means and also provides a means for varying the amount of throw imparted to the conveyor means by varying the resiliency of the flexible drive leaf, by varying the location of the connection of the drive leaf to the resilient support member, or by varying the rotational speed of the drive shaft.

The primary object of the present invention is to disclose and provide a material handling vibrating apparatus wherein novel actuating means are provided for imparting vibratory forces to a resiliently supported conveyor means.

An object of the invention is to disclose and provide a material handling vibrating apparatus wherein a rotatable shaft is supported and stabilized in novel manner from conveyor means and from novel actuating means.

An object of the invention is to disclose and provide actuating means for a material conveying apparatus and which embodies relatively light weight construction and is economical and inexpensive to manufacture.

A further object of the invention is to disclose and provde an actuating means for a vibratable apparatus in which the amount of throw transmitted to the material conveying means may be readily modified.

A still further object of the present invention is to disclose and provide an actuating means which is readily adaptable to various types of conveyor means constructions.

A still further object of the present invention is to disclose and provide a material handling vibrating apparatus wherein a plurality of conveyor sections are arranged in tandem and in which a relatively long conveyor may be effectively actuated.

Other objects of the invention contemplate the employment of a flexible drive member, having resilient characteristics in at least one dimensional direction and non-flexible in another dimensional direction, between an eccentric connection on a rotatable shaft and an inclined support member for a vibratable conveyor section. In some modifications of the invention the inclined support member may be rigid members or yieldable resilient members. The flexible drive member may be of leaf-type or of a coil spring or elongated rubber type. Advantages of such constructions are to soften and make less sharp and pronounced the change in direction of the vibratable conveyor and to thereby reduce or eliminate bearing problems and wear. The invention contemplates a flexible drive means for a vibratable conveyor of the type described in which counterbalance means is combined with the drive means in novel manner.

In the drawings:

FIG. 1 is a side elevational view of one embodiment of the present invention.

FIG. 2 is a transverse horizontal sectional view taken in the plan indicated by line II—II of FIG. 1.

FIG. 3 is a perspective view of another embodiment of the present invention in which the vibrating apparatus includes a plurality of conveyor sections and a floating shaft.

FIG. 6 is a transverse vertical sectional view taken in the plane indicated by line VI—VI of FIG. 5.

FIG. 7 is a fragmentary view of a modification of a drive leaf.

FIG. 8 is a fragmentary side elevational view taken in a plane similar to FIG. 5 and showing a different modification of the flexible drive means of this invention.

FIG. 9 is a fragmentary side elevational view taken in the same plane as FIG. 8 and showing still another modification of the invention.

FIG. 10 is a fragmentary side elevational view of a flexible drive means similar to FIG. 1 and embodying still another modification of the invention.

Figure 4:
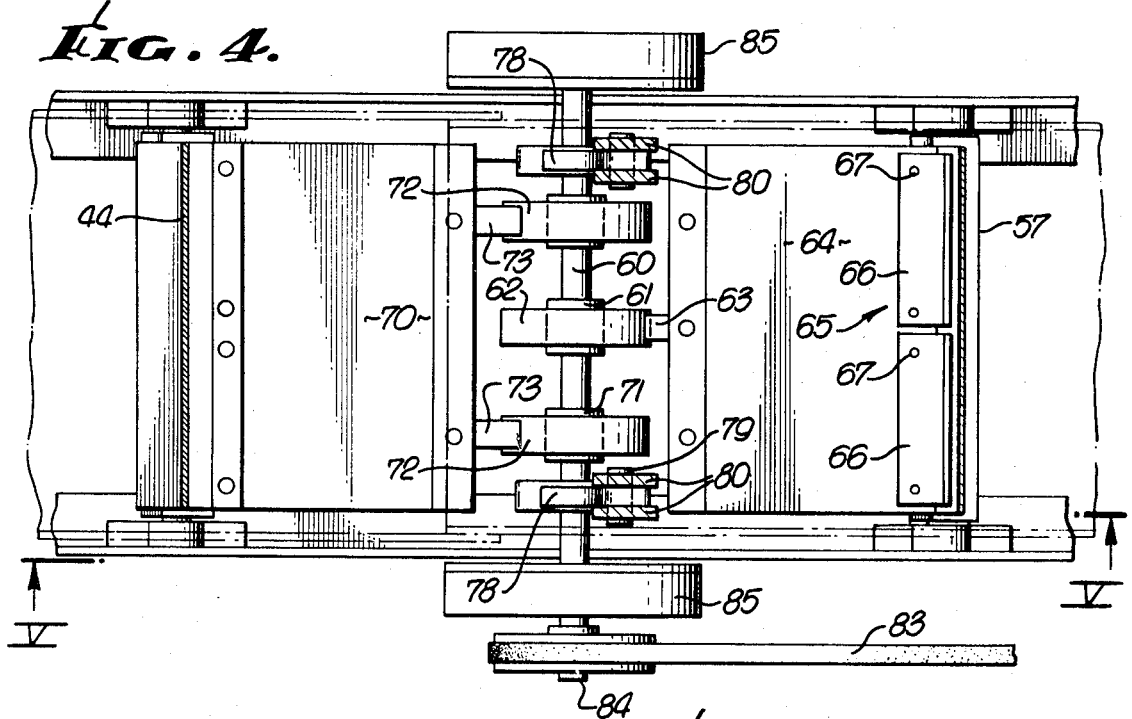
FIG. 4 is a fragmentary enlarged sectional view taken in the transverse horizontal plane indicated by line IV—IV of FIG. 5.

In the embodiments of the invention shown in the drawings the novel actuating means will be first described with respect to FIGS. 1 and 2 in which a material handling vibratory vibrating apparatus generally indicated at 10 comprises a base frame means 11, a conveyor means 12 and a plurality of longitudinally spaced resilient flexible inclined supporting members 14. Conveyor means 12 provides a longitudinally extending trough 15 for moving material along a longitudinal path by imparting to said material vertical and longitudinal force components. Generally speaking, such a construction is shown in Pat. 3,362,524.

Base frame means 11 may include a pair of parallel longitudinally extending base members 17 made by any suitable steel section and secured to a supporting surface, such as a floor of a building in suitable manner. Base member 17 may be interconnected by transverse members (not shown) for rigidity.

Conveyor means 12 in this example may comprise a single conveyor section 18 having a length corresponding to the length of base frame means 11. Conveyor section 18 includes trough 15 defined by spaced parallel side walls 19 of suitable height for confining material being moved. Conveyor section 18 may also include conveyor frame members 20 of suitable steel section to provide sufficient rigidity to the conveyor section.

In this example a pair of longitudinally spaced inclined members 14 are shown interconnecting and supporting the conveyor means 12 above the base frame means 11. Each inclined member 14 may be made of one or more resilient leaves of rectangular form having their top edges fixed to the conveyor frame members 20 and their bottom edge portions fixed to the base frame members 11. The angle of inclination of members 14 are the same, members 14 lying in parallel planes, the angle being selected depending upon the magnitude of the vertical and longitudinal force components to be transmitted to the conveyor means 12.

Actuating means generally indicated at 22 for the apparatus 10 in this example comprises a flexible resilient drive leaf member 23 of rectangular form and similar in construction and material as inclined leaf members 14. Drive leaf member 23 is disposed parallel to the conveyor section 18 and the path of material moved thereby. Drive leaf member 23 may be provided a suitable transverse connection at 24 to member 14 by means of an obtuse angle sectioned bracket 25 having a horizontal leg upon which the transverse end portion 26 of member 23 may seat and be secured thereto as by suitable nut and bolt assemblies. The other leg of angle section member 25 lies parallel to inclined member 14 and may be secured thereto by suitable nut and bolt assemblies. The transverse connection at 25 may occur at a selected space above base frame means 11 or below conveyor means 12 depending upon the radius through which the upper edge portion of member 14 is to move during operation.

The opposite end portion 28 of drive leaf member 23 may be connected to a tongue 29 provided on the outer nonrotatable housing 30 provided with an eccentric connection at 31 to a rotatable drive shaft 32 extending transversely of the base frame means 11. Opposite end portions of shaft 32 may be journally supported in suitable antifraction pillow block members 33 secured to base frame members 17. One end of shaft 32 may project beyond base frame member 17 to provide a suitable connection to a drive pulley means 34 and a drive motor 35. Drive motor 35 may be mounted on the base frame means 11 or a suitable structure at one side of the apparatus.

In operation rotation of shaft 32 imparts through the eccentric connection 31 a generally horizontal reciprocal motion of the flexible drive leaf 23. The reciprocal motion of leaf member 23 is imparted to the inclined member 14 at the transverse connection 25 and causes the inclined member 14 to pivot about its bottom edge portion which is connected to the base frame members 17. The amount of travel of transverse connection 25 by reason of the reciprocal motion of drive leaf 23 produces corresponding travel of the intermediate portion of inclined member 14, such travel being magnified at the upper edge portion of inclined member 14 at its connection to the conveyor frame members 20. The flexibility of the inclined members 14 between the transverse connection at 25 and the conveyor frame members 20 provides an increase in the amount of throw or travel radius at conveyor section 18 and the longitudinal travel is augmented or increased by such flexibility. Flexibility of the drive leaf member 23 permits bending of the leaf member and such bending permits additional longitudinal travel of the transverse connection at 25. Thus it will be apparent that the amount of throw at eccentric connection 31 is amplified by flexing of drive leaf member 23 and inclined member 14 so that the radius through which the upper end of inclined member 14 travels is amplified.

The effective transmission of longitudinal and vertical force components to the conveyor section 18 through the connection of the top edge portion of inclined member 14 to conveyor section 18 is correlated to the degree of flexure of drive leaf member 23 and inclined leaf member 14, the speed of rotation of the rotatable shaft 32 and the location of the transverse connection 25 relative to the base frame means 11.

Figure 5:
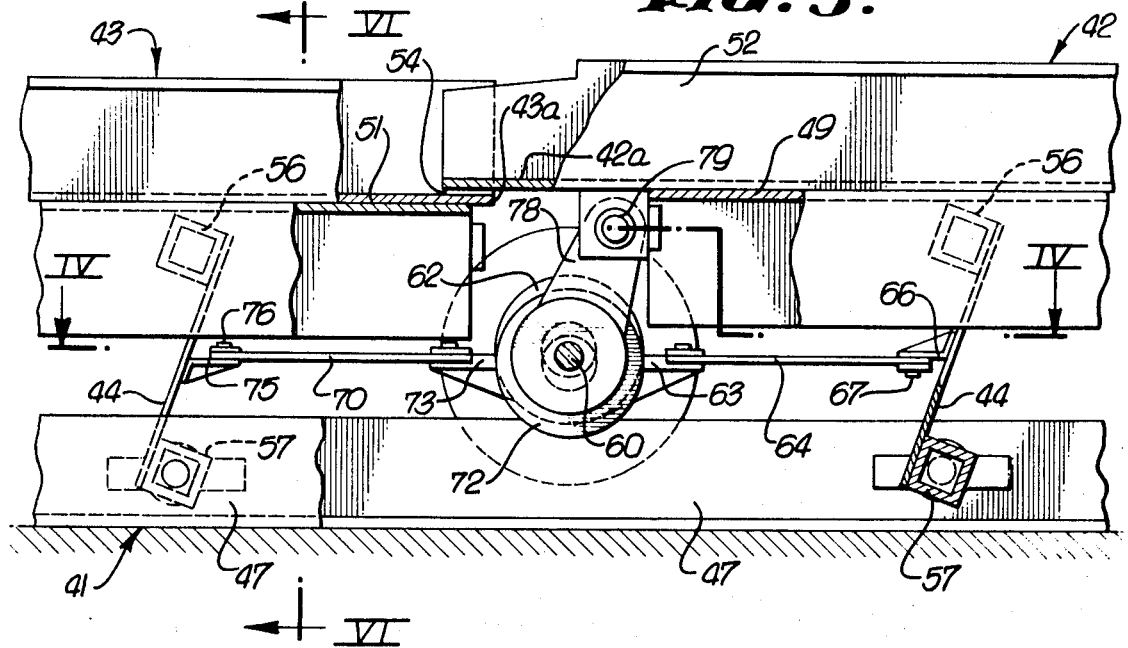
FIG. 5 is a fragmentary elevational view of the apparatus shown in FIG. 4, the view being taken in the planes indicated by lines V—V of FIG. 4.

In FIGS. 3–6 inclusive, a different embodiment of the present invention is shown. In this example material handling apparatus generally indicated at 40 may comprise an elongated base frame means 41 and at least two conveyor sections, namely, a feed section 42 and a discharge section 43. Conveyor sections 42, 43 are supported above base frame means 41 by a plurality of longitudinally spaced inclined resilient flexible leaf members 44. At the adjacent proximate conveyor section ends of conveyors 42 and 43 actuating means are provided for imparting selected vibrations to the conveyor sections. Also adjacent the proximate conveyor section ends may be provided means for driving the actuating means for the conveyor sections. A suitable feed hopper 45 may supply material to be transported or separated to the other end of conveyor feed section 42. In general, the arrangement and configuration of apparatus 40 resembles that of the apparatus described in my Pat. 3,362,524.

In detail, base frame means 41 may comprise a pair of parallel longitudinally extending base frame members 47 of suitable steel section and secured in suitable manner to a supporting floor surface. Base frame members 47 may be continuous for the entire length of apparatus 40 or may comprise a plurality of sections corresponding to conveyor sections which may be associated and connected with sections 42, 43 in suitable manner to permit continuous flow of material. Thus, the overall length and load conditions of the conveyor means may be modified and changed.

Conveyor sections 42 and 43 may each comprise a pair of parallel longitudinally extending conveyor frame members 49 of suitable steel section, the frame members of section 42 being supported by resilient members 44 slightly higher than the corresponding frame members of section 43. Material trough means 50 of suitable sheet gauge metal may be supported from conveyor frame members 49 and may include a bottom wall 51, spaced side walls 52 and outwardly directed horizontal flanges 53. Trough means 50 of conveyor section 42 extends slightly over the adjacent end of discharge conveyor means 43 as indicated at 54. Relative vertical movement of the adjacent ends of conveyor sections 42 and 43 is thus permitted during operation of the apparatus.

Resilient flexible members 44 which resiliently support the conveyor sections 42, 43 may comprise rectangular inclined leaf members each made of suitable metal or of impregnated multi-ply laminated fibrous material and the like. Inclined members 44 may be one or more transversely spaced leaf sections if desired.

Upper transverse edge portions of each inclined member 44 may be secured as by welding to a square section transverse member 56 which may be secured at opposite ends by suitable means to conveyor frame members 49. The bottom edge portion of each inclined member 44 may be similarly secured as by welding to a transverse square section member 57 which is displaced longitudinally relative to top member 56 so that inclined member 44 will be tilted toward the feed end of conveyor section 42. A suitable selected angle, for example, may be 60°.

In the present embodiment of the invention a lower transverse member 57 may be secured to the base frame members 47 without an adjustable pivot support, such as disclosed in Pat. 3,362,524. If desired, such an adjustable pivot means may be provided although it does not form part of the present invention.

Means for actuating conveyor sections 42, 43 may be supported below and adjacent proximate conveyor end sections 42a and 43a. Such actuating means may comprise a transversely extending rotatable shaft 60 provided with a centrally located eccentric bearing means 61 supporting a nonrotatable outer housing 62 connected by a tongue 63 to a rectangular drive leaf member 64. Drive leaf member 64 is thus provided with an eccentric connection to shaft 60 along one edge portion and at its opposite edge portion drive leaf member 64 is provided with a transverse connection to a bracket means 65 secured to inclined member 44 between its top and bottom edges. Bracket means 65 may be formed of two transverse bracket sections 66 each secured as by suitable nut and bolt assemblies 67 to the transverse edge portion of drive leaf member 64.

Substantially diametrically opposite to drive leaf member 64 is provided a drive leaf member 70 for conveyor section 43. Drive leaf member 70 is provided an eccentric connection to shaft 60 by a pair of spaced eccentric bearing means 71 on shaft 60 and carrying nonrotatable housings 72 each connected by a tongue 73 to the adjacent transverse edge portion of drive leaf member 70. The opposite edge portion of member 70 is provided a transverse connection to bracket means 75 secured to the adjacent inclined member 44 between its top and bottom edges. Bracket means 75 is secured to the transverse edge portion of drive leaf member 70 by suitable nut and bolt assemblies 76. Shaft 60 may be also supported by a pair of spaced stabilizing arms 78 pivotally connected to shaft 60 and pivotally connected by pins 79 supported from spaced depending walls 80 carried at the ends of conveyor frame members 49 on conveyor section 42. The longitudinal axes of stabilizing arms 78 are inclined and lie parallel to the planes defined by inclined members 44.

Eccentric throw of bearing means 71 and 61 is disposed in 180° relationship and in neutral position are disposed vertically and at right angles to the horizontally disposed drive leaf members 64 and 70. The axis of stabilizing arms 78 is preferably inclined as shown, however, such disposition of the stabilizing arm axes may be varied if desired.

It will thus be apparent that rotatable shaft 60 is supported by the flexible drive leaf members 64 and 70 and the stabilizing arms 78 and in effect fully floats upon the resilient flexible inclined support members 44.

Means for driving shaft 60 may comprise a motor means 82 mounted adjacent base frame means 41 and secured to a supporting floor surface. Motor means 82 may be connected by a suitable drive pulley means 83 to a shaft extension 84 of shaft 60. Shaft 60 may support at opposite ends thereof suitable fly wheels 85.

In operation material may be fed through hopper 45 to the adjacent end of feed conveyor section 42. As the material falls upon the conveyor section 42 vibratory forces are transmitted to the material so that both vertical and longitudinal force components will cause the material to move along the flow path defined by the trough means 50. As the material reaches the joint between conveyor sections 42 and 43 it will be passed on to the conveyor section 43 because of the overlapping of the adjacent conveyor ends. To commence vibration of the conveyor sections 42, 43 motor means 82 affords an initial heavy starting torque to shaft 60 to move eccentric means 61, 71 out of their neutral position. After shaft 60 is rotating and fly wheels 85 become effective, the motor load during continuous operation of the conveyor is reduced because of the resilient action of the resilient flexible inclined support members 44 which assist in movement of the material.

In this example of the invention it is important to note that the transverse connections of the drive leaves 64, 70 to their associated eccentric means with the drive shaft 60 therebetween lie in a horizontal plane and the axis of stabilizing arm 78 is disposed at an angle thereto. The axis of the stabilizing arm lies parallel to the inclination of support leaves 44. In view of the transverse connection of leaves 64, 70 to the central portion of the adjacent inclined support leaves 44, the effective radius or arc of movement of the upper ends of the members 44 are virtually equal to the radius or distance between the pivotal axis of the stabilizing arm at 79 and the axis of shaft 60. During rotation of shaft 60, shaft 60 is thus stabilized and does not tend to move laterally of its axis. The pivotal axis at 79 of the stabilizer arm to the conveyor section 42 moves through an arc which is equal to the effective arc of movement of the inclined memebrs 44 supporting the conveyor section.

In operation it should be noted that the eccentric means 61, 71 are so arranged that the drive leaves 64, 70 will provide a pushing force through leaf 64 to inclined support member 44 while at the same time drive leaf 70 will provide a pulling force on its associated inclined support member 44. Thus, the push-pull forces developed by the eccentric means from the rotating shaft and transmitted through the flexible drive leaves 64, 70 will be transmitted to the flexible inclined members 44 of both conveyor sections 42, 43. Thus, in addition to the effective radius of inclined leaf support members 44 which may act to amplify the length of the arc through which the top end portions of the members 44 travel, a certain amount of resiliency and flexure of drive leaf members 64, 70 are also transmitted to the members 44. Thus, a resilient drive is provided which depends upon the flexure of the drive leaves 64, 70 and inclined support members 44.

In the example shown drive leaves 64, 70 are illustrated between the eccentric connections and the adjacent support members 44. In FIG. 7 such drive leaves may be modified to provide a multi-ply or laminated drive leaf construction. In FIG. 7 a multi-ply drive leaf is indicated at 90 and may comprise leaf members 91, 92 and 93 secured at their ends to the drive shaft and support member 95. The surfaces between the leaf members 91, 92 and 93 may be separated by Teflon or other antifriction self-lubricating material. The support member 95 may also be modified to include multi-leaf construction as shown in FIG. 7. Leaf elements 96 and 97 may be shorter than main leaf 98 and may be secured by a center bolt to connecting clip 99 fixed to drive leaf 90.

The provision of drive leaves 64, 70 between the rotatable shaft 60 and the adjacent support members 44 initiates a drive construction which can be augmented and modified in various ways. For example, depending upon the load conditions and length of the conveyor, drive leaves may be provided between each pair of adjacent support members 44 throughout the length of the conveyor. In such transmission of drive impulses the plurality of drive leaf members may be of lighter weight construction since the drive forces are transmitted and distributed throughout the length of the conveyor. In another example drive leaf members may be provided between the next set of adjacent support members 44 in order to provide sufficient strength and flexibility for the particular operating conditions.

In a further modification which is readily permitted by the above construction, the drive leaves 64, 70 may be disposed at a suitable angle and may be connected to a lower portion of support members 44 so that the effective flexible resilient action of the support members 44 may be modified and, in this instance, amplified. Similarly the ends of drive leaf members 64, 70 may be connected closer to the upper edge portions of members 44 so as to restrict, if desired, the effective radius of the arc of members 44. It thus becomes apparent that the amount of throw imparted to the conveyor sections 42, 43 can be readily adjusted by modifying the connection of the drive leaf members to the flexible inclined support members 44.

It is also important to note that the manner of connecting the actuating means to the conveyor sections avoids the use of heavy metal bracket devices in order to transmit the drive impulses directly to the conveyor section frames, and thus a lighter weight, less expensive construction of apparatus 10 is provided. Since the shaft 60 is virtually completely floating, wear on bearings caused by slightly inaccurate or cut of line installation is avoided and minimized.

In the modification shown in FIG. 8 the vibratory apparatus differs from the above described embodiments of the invention by providing a resilient leaf-type stabilizing member 100 between an actuating shaft 101 and a conveyor section 102. In addition, actuating shaft 101 is connected by flexible drive leaf means 103 to rigid nonflexible inclined support members 104 extending between base frame 105 and conveyor sections 106 and 102. Each rigid inclined support member 104 may be pivotally connected at 107 to base frame 105 and at its upper end pivotally connected at 108 to a conveyor section 106, 102. Flexible drive leaf 103 is pivotally connected at 109 intermediate ends of rigid member 104.

In this modification it will be apparent that the rigid members 104 are not capable of flexing and that the drive leaf 103 absorbs the shock loads occurring in change of direction of vibration of the conveyor sections 106, 102. Thus, the type of vibratory agitation is somewhat different and the drive is relatively hard and abrupt. It will be understood that for certain types of materials such a type of drive may be desirable.

In the modication shown in FIG. 9 the structure is similar to that of FIG. 8 except that in place of drive leaf 103 a spring member 112, such as a coil spring as shown or a solid elongated rubber member interconnects the actuating shaft 101 with the rigid inclined support member 104. Support members 104 are pivotally connected to the base frame 105 and conveyor sections 106 and 102 in the same manner as in FIG. 8. The ends of the resilient member 112 may be connected with the actuating shaft 101 and the rigid member 104 in suitable manner.

In operation of the embodiment shown in FIG. 9 it will be apparent that the eccentric throw of the eccentric means carried by shaft 102 will impart a compressive force to the resilient member 112 in an axial direction and which is transmitted to the rigid support members 104. The action and response of a compressible resilient member 112 is somewhat different than that of a flexible leaf member 103, and thus the vibratory forces imparted to the conveyor sections 106, 102 may be of somewhat different character than that described in the prior embodiments.

In the modification of the invention shown in FIG. 10 it will be noted that the construction is similar to FIG. 1 and includes a single conveyor section 21 supported by resilient inclined members 14 driven by a flexible drive leaf 23 and provided with an actuating shaft 32. Means for driving the actuating shaft includes the belt drive 34 to a motor not shown which may be mounted on base means 11' or on the floor. Base means 11' may be supported from the floor 115 by suitable resilient mountings 116 such as rubber or spring means for minimizing transmission of vibrations to the floor and for permitting the base means 11' to act as a counterweight to the action imparted to the conveyor section. If necessary, additional weights may be added to base means 11' to obtain the desired vibratory action of the conveyor sections.

It will be understood that counterweight means may be included with the other embodiments of the invention described above and that such counterweight means may be carried by one of the conveyor sections or by the base means.

It will be apparent that the actuating means for the apparatus 10 described above is so constructed and arranged that vibratory forces imparted to the conveyor sections are effectively employed to movement of material in the conveyor sections and that forces transmitted to the supporting floor structure are minimized and virtually eliminated. It will be apparent that various modifications and changes may be made in the arrangement of the actuating means and all such changes and modifications coming within the scope of the appended claims are embraced thereby.

I claim:

1. In a material handling apparatus, the combination of:
   an elongated base frame means;
   a correspondingly elongated conveyor means spaced from and generally parallel to said base frame means;
   said conveyor means including longitudinally aligned conveyor sections having adjacent section ends;
   a plurality of longitudinally spaced inclined members supporting said conveyor sections from said base frame means;
   actuating means for said conveyor means including a rotatable shaft,
   and means flotatably supporting said shaft and including
   oppositely directed flexible yieldable members having adjacent ends each provided with an eccentric connection to said shaft and remote ends each provided with a connection to inclined members adjacent thereto, said latter connections being intermediate top and and bottom ends of said adjacent inclined members,
   and a stabilizing arm for said rotatable shaft and having one end pivotally connected to said rotatable shaft and having the other end connected to one of said conveyor section ends; and
   drive means for said shaft.

2. In an apparatus as stated in claim 1 wherein said stabilizing arm has an axis lying in a transverse plane parallel to said inclined members.

3. In an apparatus as stated in claim 1, wherein said oppositely directed flexible members comprise flexible rectangular leaves and have their remote ends connected to mid-portions of adjacent inclined members.

4. In an apparatus as stated in claim 1, wherein said stabilizing arm includes a flexible leaf member.

5. In an apparatus as stated in claim 1, wherein said inclined members supporting said conveyor sections include yieldable leaf members.

6. In an apparatus as stated in claim 1, wherein said stabilizing arm has one end connected to the conveyor section end of the conveyor section disposed upstream of the flow path of material conveyed by said apparatus.

(References on following page)

References Cited

UNITED STATES PATENTS

| | | | |
|---|---|---|---|
| 3,476,234 | 11/1969 | Allen et al. | 198—220CB |
| 786,337 | 4/1905 | Zimmer | 198—220(D20) |
| 1,858,328 | 10/1925 | Heymann et al. | 198—220(D22) |
| 2,499,171 | 2/1950 | Sinden | 198—220(C12) |
| 2,899,044 | 8/1959 | Allen et al. | 198—220(D22) |
| 3,358,815 | 12/1967 | Musschoot et al. | 198—220(D22) |
| 3,362,524 | 1/1968 | Holman | 198—220(C12) |

FOREIGN PATENTS

| | | | |
|---|---|---|---|
| 648,127 | 7/1937 | Germany | 198—220(D22) |

RICHARD E. AEGERTER, Primary Examiner

U.S. Cl. X.R.

198—DB